Aug. 17, 1954    W. H. SILVER ET AL    2,686,465
CONTROL MECHANISM FOR PLOWS
Filed Feb. 9, 1950    2 Sheets-Sheet 1
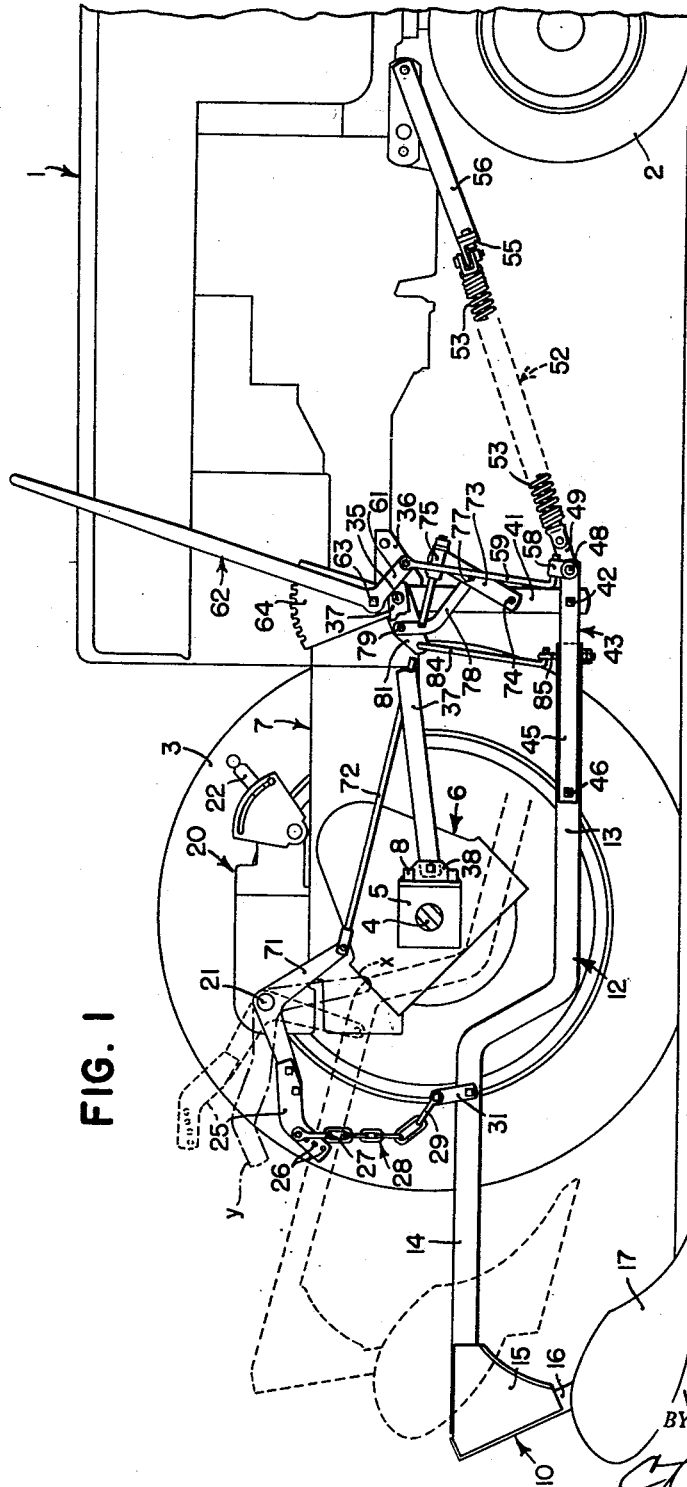
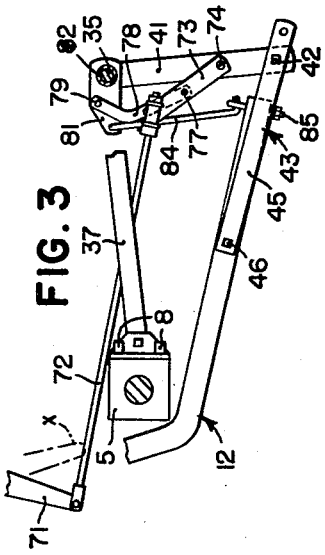
INVENTORS.
WALTER H. SILVER
WILLIAM V. LOHRMAN
BY
ATTORNEYS

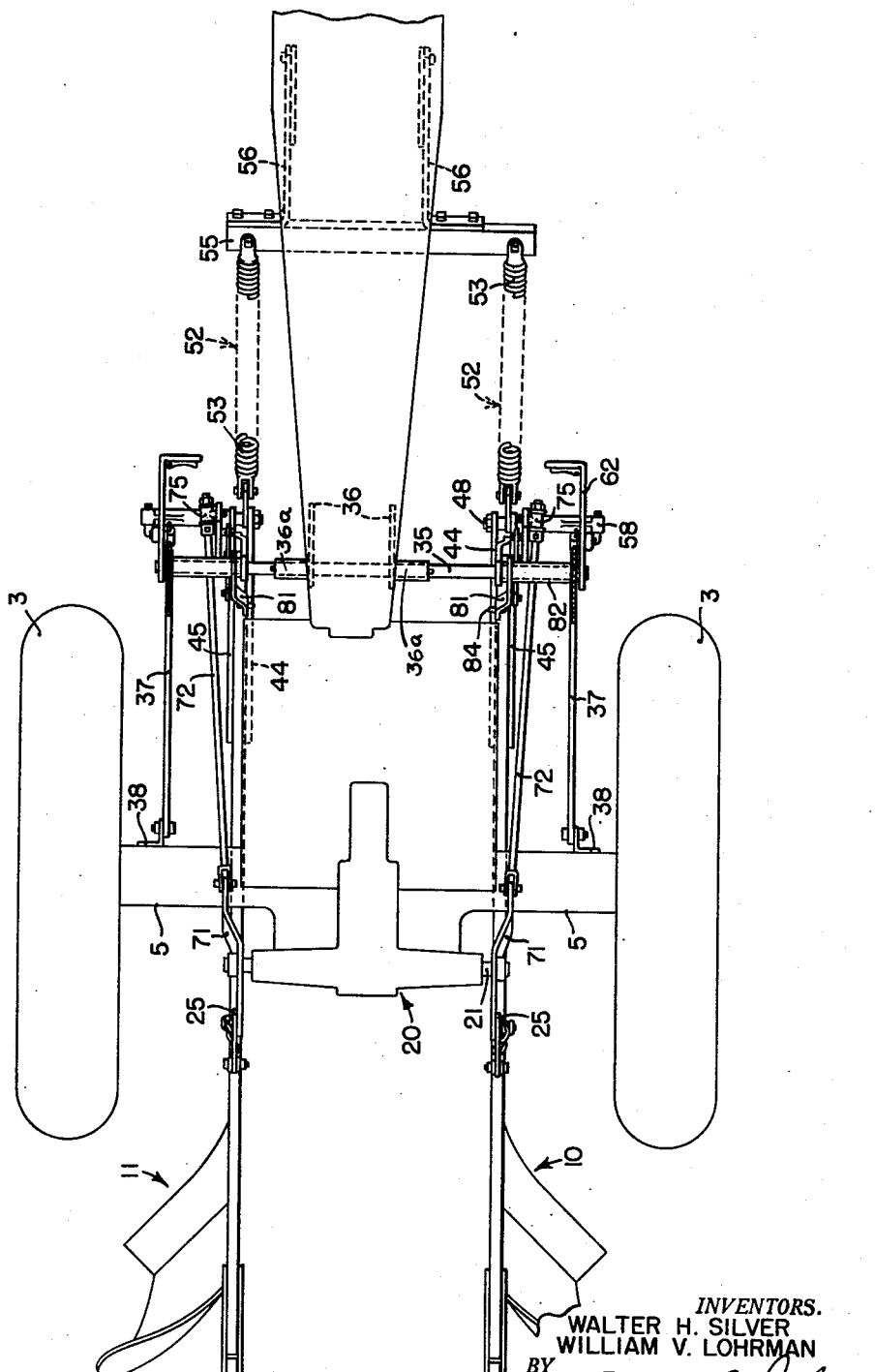

Patented Aug. 17, 1954

2,686,465

UNITED STATES PATENT OFFICE 2,686,465

CONTROL MECHANISM FOR PLOWS

Walter H. Silver, Moline, Ill., and William V. Lohrman, Davenport, Iowa, assignors to Deere & Company, Moline, Ill., a corporation of Illinois Application February 9, 1950, Serial No. 143,224

15 Claims. (Cl. 97—46.93)

1

The present invention relates generally to tractor-mounted implements and is more particularly concerned with tractor-mounted plows and the like.

The object and general nature of the present invention is the provision of a combined depth-adjusting and raising and lowering mechanism operative for controlling the depth and subsequently raising the plow into a transport position by means actuated from the power lift unit of a tractor.

More specifically, it is an important feature of the present invention to provide a tractor-mounted plow construction in which the front and rear end portions of a plow beam are connected with the tractor by means of a pair of lost-motion connections operated simultaneously by the power lift unit but arranged so that the front end of the plow beam is raised first and then the rear end is raised, the lost-motion connections being so constructed that the first range of movement of the power lift unit acts to raise the front end of the plow beam while the connection with the rear end merely takes up the lost motion in that connection without actually raising the same, but after the power lift unit has moved through its first or depth-adjusting range of movement, the rear end of the plow beam is raised into a transport position while the front end of the plow beam remains substantially in its most shallow plowing position, the forward lost-motion connection acting by virtue of movement of the power lift unit through its second range of movement merely to take up the lost motion therein but not to raise the front end of the plow beam beyond its shallow plowing position.

A further feature of the present invention is the provision of a tractor plow having means for raising and lowering the front end of the plow beam to effect changes in the depth of plowing, as by operation of the tractor power lift, but without interfering with the freedom of movement of the rear portion of the plow to swing generally vertically relative to the tractor, whereby passage of the tractor over uneven ground has little effect so far as raising and lowering the furrow opener is concerned.

A further feature of the present invention is the provision of a tractor mounted plow in which the depth is controlled by means of connections which in effect, carry the front end of the plow beam on the power lift mechanism, whereby operation of said mechanism serves to raise and lower the front portion of the plow beam, and

2 thereby control the depth of operation, but without preventing the rear end of the plow beam and the furrow opener carried thereby from moving relatively freely in a generally vertical direction relative to the rear of the tractor. As a result of this arrangement, fairly uniform plowing is achieved even though the front end of the tractor moves upwardly or downwardly, as in passing over ridges, hollows and the like.

These and other objects and advantages of the present invention will be apparent to those skilled in the art after a consideration of the following detailed description, taken in conjunction with the accompanying drawings wherein the preferred form of the invention has been illustrated.

In the drawings:

Figure 1 is a side view of a tractor-mounted plow in which the principles of the present invention have been incorporated.

Figure 2 is a plan view of the plow shown in Figure 1.

Figure 3 is a fragmentary detail showing the position of the depth-adjusting linkage when the plow is in its transport position.

Figure 4 is a view similar to Figure 3, showing the position of the depth-adjusting linkage substantially at the end of a depth-adjusting range of the lifting mechanism and substantially at the beginning of the lifting range. Figures 3 and 4, taken together, showing the manner in which completion of the elevation of the rear end of the plow is accompanied by no further raising of the front end of the plow beam; in face, the front end of the plow beam is lowered slightly.

Referring now to the drawings, more particularly to Figure 1, the tractor is indicated in its entirety by the reference numeral 1 and includes a pair of closely spaced front wheels 2 and a pair of widely spaced rear traction wheels 3 mounted in axle shafts 4 that are carried in extensions 5 that form a part of a rear axle structure 6. The latter is secured to or forms a part of the frame 7 of the tractor, and the rear tractor axle 6 includes attaching studs 8 or the like that are adapted to receive various implement parts.

The plow which has been shown by way of illustration as incorporating the features of the present invention is a two-way plow, including right- and left-hand units 10 and 11, and, since these units are substantially identical, except that some of the parts are right-hand while others are left-hand, a detailed description of the right-hand unit 10 will suffice for a complete understanding of the present invention.

The right-hand unit 10 includes a plow beam 12 which is made up of a generally horizontally disposed, longitudinally extending beam section 13 underlying the tractor axle 6, when attached to the tractor, and a rear beam section 14 offset upwardly rearwardly of the axle and connected at its rear end by brackets 15 to a generally downwardly and forwardly extending standard 16 to the lower end of which a furrow opener 17 is fixed. The tractor 1 is provided with a power operated unit 20, of conventional construction so far as the present invention is concerned, the unit 20 constituting power lift apparatus which includes a power lift part or member in the form of a transverse rockshaft 21 disposed for movement about a transverse axis at the rear of the tractor, being movable through approximately sixty degrees by hydraulic means, deriving operating energy from the motor of the tractor, and controlled by a valve lever 22. Secured to the right end of the power lift part 21 is a rear arm 25 which extends generally rearwardly and has a plurality of openings 26 at its rear portion in any of which an upper clevis 27 may be connected. The clevis 27 forms a part of a lifting chain 28 that normally is slack when the plow is in operation, which is the position shown in Figure 1, the lower end of the chain 28 being connected by a clevis 29 and a strap 31 to the rear portion 14 of the plow beam 12. The arm 25 forms a part of a swingable member 71, referred to below, which is fixed to the power lift shaft 21 and which is connected with the plow beam 12 through a lifting means or lifting connection that includes the arm 25 and the chain 28, and the sections 25 and 71, taken together, constitute a bell crank, as best shown in Figure 1, adapted to be operated by the power lift part 21. When the power lift unit 20 is operated to raise the plow into its transport position, the arm 25 swings upwardly about to the position shown in dotted lines in Figure 1.

A supporting shaft 35 extends entirely across the tractor and is connected thereto by attaching plates 36 which have sleeve sections 36a that receive the supporting bar 35 and carry the same in such positions as to accommodate their connections to the sides of the tractor frame 7. The outer ends of the supporting bar 35 are reenforced in a fore and aft direction by a pair of braces 37, each of which is connected at its forward end to the associated outer end of the bar 35 and at its rear end to the laterally outer portion of the axle extension 5, being connected thereto by a suitable bracket 38 that is fixed to the adjacent studs 8.

The bar 35 provides a means for connecting the upper end of a fore and aft swingable support 41 to the tractor 1, the upper end of the support 41 being pivotally mounted on the bar 35 a distance inwardly of the laterally outer end of the bar 35. The lower end of the swingable support 41 is apertured to receive a pivot 42 by which a draft member 43 is connected intermediate its ends to the lower end of the swingable support 41. The draft member 43 comprises a pair of bars 44 and 45 which are apertured at their rear ends to receive a pivot 46 that passes through an opening in the front portion 13 of the plow beam 12 rearwardly of the front end of the latter. The draft member 43 extends forwardly a short distance from the pivot 42 and carries a laterally outwardly extending part 48, the inner portion of which, between the front ends of the bars 44 and 45, serves as means pivotally receiving the rear portion of a draft link 49. Connected to the forward portion of the link 49 is a yieldable draft hitch 52 which includes a heavy spring 53 that is connected at its forward end to a cross angle 55 connected by hitch straps 56 to the front portion of the tractor in draft-transmitting relation. The hitch angle 55 extends entirely across the front portion of the tractor but the rear end of each of the hitch devices 52 is connected to the associated draft link 49 at a point substantially rearwardly of the center of the wheel base of the tractor 1, in a fore and aft direction. The outermost end of the laterally outwardly extending part 48 carries a swivel 58 which is connected to the lower end of an upwardly extending link 59, the upper end of which is connected to an extension 61 forming a part of a landing lever 62. The latter is pivoted, as at 63, to a sector 64 which is fixed to the brace 37 and, when the implement is attached to the tractor, forms a rigid part with respect to the latter. Moving the lever 62 in a fore and aft direction acts through the lever extension 61 and the link 59 to raise or lower the outer end of the part 48 and thus swing the plow beam 12 and furrow opener 17 about a generally fore and aft extending axis, thereby leveling the plow in a lateral direction.

The depth-adjusting means acting between the front end of the plow beam 12 and the tractor will now be described. Referring to Figure 1, the rear swingable member 71 is connected to the end of the power lift shaft 21, the arm 25 preferably forming a part of the rear swingable member 71, and a motion-transmitting part in the form of a link 72 is connected at its rear end to the swingable member 71 and at its forward end to a front swingable member 73 that is pivotally mounted, at 74, on the swingable support 41. The front end of the link 72 is pivotally connected by any suitable means, as at 75, to the upper end of the swingable member 73, and at an intermediate point of the latter the lower end of a generally upwardly extending link 78 is pivotally connected at 77 to the member 73. A part in the form of a second or forward arm or lever 81 is swingably mounted by means of a sleeve 82, as best shown in Figure 2, on the transverse supporting bar 35. The upper end of the link 78 is connected at 79 to an intermediate point of the second arm 81, and the rear end of the latter is connected to the front end of the plow beam section 13 by any suitable means, such as a link 84, the lower end of which is connected to the plow beam section 13 by a swivel eye member 85. Where the arm 25 and chain 28 constitute a first means connecting the rockshaft 21 with the rear portion of the plow beam, the front portion of the latter is connected with the swingable member 73 by a second means that includes the link 78, arm 81, and link 84.

The left-hand power unit 11 is of substantially the same construction and no further description is believed to be necessary. As will be obvious, the principles of the present invention may be incorporated in a one-way plow, if desired.

The operation of the plow described above is substantially as follows:

The parts are arranged as shown in full lines in Figure 1 when the plow is in normal operating position. In this position, the rear portion 14 of the plow beam 12 and the forward portion 13 thereof are substantially in a horizontal position and the swingable support 41 occupies a substantially vertical position, since the cushion spring 52 has yielded under a normal draft load. It will be noted that the draft member 43 lies substantially entirely above the line of pull exerted by the draft hitch 52, which line is considered to extend from the point of pivotal connection of the hitch straps 56 with the tractor downwardly and rearwardly through the part 48 to which the link 49 is pivotally connected. Since the draft member 43, and particularly its point of pivotal support, at 42, on the swingable support 41 lies above the aforesaid line, the draft load transmitted through the draft member 43 tends to cause the rear end of the latter to swing downwardly, in a counterclockwise direction as viewed in Figure 1, about the pivot connection 42 between the draft member 43 and the lower end of the swingable support 41. This exerts a positive action holding the front end of the plow beam 12 down and serving to insure quick penetration of the plow bottom or bottoms when starting a furrow. However, the front end of the plow beam is prevented from moving downwardly under the above mentioned component of the draft force by the link 84 and its connection with the arm 81, the latter being held against movement by its connection 78 with the swingable member 73 which, in turn, is connected through the link 72 with the power lift swingable member 71. The power lift structure 20 is such that when the valve lever 22 is in its neutral position, the power lift shaft 21 is locked against movement in a counterclockwise direction, as viewed in Figure 1.

If the operator should desire to change the depth of operation, that is, to increase it or decrease it, the operator actuates the valve lever 22 in the proper direction and causes the swingable member 71 to move forwardly or rearwardly. To increase the depth of plowing, the swingable member 71 is moved forwardly, which forward movement is transmitted through the link 72 to the swingable member 73, and the latter acts through the link 78 and arm 81 to permit the front end of the plow beam to move downwardly, thereby lowering the hitch point of the plow beam and consequently increasing the depth of plowing. Conversely, if the operator desires to decrease the depth of plowing, the valve lever 22 is moved rearwardly which causes a rearward movement of the swingable member 71, and this movement is transmitted through the link 72 to the swingable member 73, causing the latter to swing rearwardly and exert a thrust against the arm 81, thereby causing the latter to swing upwardly and raise the link 84 and the front end of the plow beam.

The swingable member 71 and the arm 25, actuated simultaneously by the power lift rockshaft 21, have two ranges of movement, one a depth-adjusting range and the other a lifting range. Looking at Figure 1, the movement of the swingable member 71, substantially to the position indicated by the reference character $x$ and shown in dash-and-dot lines, constitutes the depth-adjusting range, and the movement of the swingable member 71 from the position shown in full lines in Figure 1 to the position indicated by the reference numeral $x$ causes the swingable member 73 to be shifted rearwardly to a point where the pivot 77 lies in or closely adjacent to a straight line connecting the pivots 74 and 79, as shown in Figure 4. Therefore, any further rearward movement of the swingable member 73 causes substantially no further raising of the arm 81; in fact, there is a slight lowering of the arm 81 and the front end of the plow beam as the pivot point 77 swings rearwardly of the straight line joining the pivots 74 and 79. It will be noted that the depth adjusting linkage just described includes the toggle members 73 and 78, and the first movement of the swingable member 73, from the pisition shown in Figure 1 to the position shown in Figure 4, results in a raising of the arm 81 and consequently a raising of the front end of the plow beam, but further rearward movement of the swingable member 73, as from the position shown in Figure 4 to the position shown in Figure 3, occasions very little movement of the arm 81. Likewise, the connection, comprising the arm 25 and the chain 28, between the power lift part 21 and the rear portion of the plow beam also constitutes a lost-motion connection between these parts, inasmuch as the chain 28 is of such length that in the normal plowing position it is slack to such an extent that the arm 25 may move upwardly from the full-line position shown in Figure 1 to the position, indicated by the reference character $y$, shown in dot-and-dash lines in Figure 1, before the chain 28 becomes tight and further upward movement of the arm 25, as from the position marked $y$ to the uppermost position shown in dotted lines in Figure 1, constituting the active or lifting range of movement of the part 25. Thus, the active range of movement of the lifting mechanism corresponds to the lost-motion range of movement of the depth-adjusting means, and the active range of the depth adjusting means corresponds to the lost-motion range of movement of the lifting connection.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A plow adapted to be connected to a tractor having a power lift including a part movable by increments through a depth adjusting range of movement and through a further lifting range of movement, said plow comprising a plow beam having a furrow opener at its rear end and adapted to be connected with the tractor at its forward end for up-and-down movement relative to the tractor for raising and lowering the hitch point of the plow beam, two members adapted to be swingably mounted on said tractor at fore and aft spaced points, a pair of means connecting said members with the rear and front portions of said plow beam, each of said means being adapted to be connected with said power lift part to be actuated thereby, one of said means including an arm on the rear member and a chain having such length as to be slack when the power lift part occupies a position in its depth adjusting range, the other of said means including a part movable relative to the tractor and connected with the associated plow beam portion, a link, means pivotally connecting opposite ends of said link with said last mentioned part and the associated swingable member, the axes of said pivotal connections of said link being disposed so that they move through a straight-line relation with respect to the axis of swinging of said associated swingable member during the lifting range of movement of said power lift part.

2. A plow adapted to be connected to a tractor having a power lift including a part movable by increments through a depth adjusting range of movement and through a further lifting range of movement, said plow comprising a plow beam having a furrow opener at its rear end and adapted to be connected with the tractor at its forward end for up-and-down movement relative to the tractor for raising and lowering the hitch point of the plow beam, two members adapted to be swingably mounted on said tractor at fore and aft spaced points, a pair of means connecting said members, respectively, with the front and rear portions of said plow beam, one of said means including lost motion mechanism operative through a part only of the motion of the associated member to transmit movement to the associated plow beam portion and the other of said connecting means including parts movable through a substantially dead-center relationship whereby when moving through said dead-center relationship substantially no motion is transmitted to the associated swingable member, said members being connected with one another and with said power lift part so as to be operated simultaneously thereby, and said lost motion means being arranged one with respect to the other connecting means, including the associated parts that are movable through substantially dead-center relationship so that during one range of movement of said power lift part one of said connecting means is ineffective to transmit any substantial amount of movement to the associated plow beam portion and during the other range of movement of said power lift part the other connecting means is ineffective to transmit any substantial amount of movement to the associated plow beam portion.

3. A plow adapted to be connected to a tractor having a power lift including a part movable by increments through a depth adjusting range of movement, said plow comprising a plow beam having a furrow opener at its rear end, and adapted to be connected with the tractor at its forward end for up-and-down movement relative to the tractor for raising and lowering the hitch point of the plow beam, a bell crank adapted to be operated by said power lift part through both of said ranges of movement, a lost motion connection between said plow beam and said bell crank, said lost motion means including parts movable relative to one another during said depth adjusting range but movable into motion-transmitting relation when said power lift part moves through its lifting range, a lever adapted to be mounted on the tractor generally above the front end of said plow beam and operatively connected therewith for raising and lowering the front end of the plow beam, means including a pair of pivotally interconnected links adapted to be connected between the tractor and said lever, and a connection between one of said links and said bell crank whereby movement of the latter through both of said ranges swings said pivotally interconnected links, the latter being connected with the plow beam, said bell crank and the tractor in such angular relations that said links move substantially through their straight-line relation when said bell crank and power lift move through said lifting range, whereby the front end of said plow beam is held substantially against movement during said lifting range but is raised and lowered when said power lift part and bell crank are moved through said depth adjusting range of movement.

4. In a tractor mounted plow having a generally longitudinally extending beam and adapted to be mounted on a tractor having a power operated unit, the improvement which includes depth adjusting and lifting mechanism comprising a forward arm adapted to be pivotally mounted on the tractor, means connecting the swinging end of said arm with the front end of said beam, a rear arm adapted to be pivotally mounted on the tractor and having its swinging end extending rearwardly, means establishing a lost motion connection including relatively movable parts connected between the rear end of said rear arm and the rear portion of said plow beam, a part connected at its rear end with said rear arm so as to be moved by the latter, motion-transmitting means operably connecting the forward end of said part with said forward arm, said motion-transmitting means including a member adapted to be swingably connected with the tractor, a link pivotally connected at one end with said swingable member and at its other end with said forward arm, said forward arm, link and swingable member being arranged whereby the pivotal connection of said link with said swingable member moves through and beyond a straight line connecting the axis of swinging of said swingable member and the point of pivotal connection between said link and said forward arm, whereby when said rear arm approaches its raised position, said forward arm is lowered.

5. The invention set forth in claim 4, further characterized by a fore and aft swingable support adapted to be carried by the tractor and operatively connected with the front end of said plow beam, yieldable hitch means connecting the lower end of said swingable support with the front portion of said tractor, and said swingable member being pivotally mounted on said swingable support, whereby said swingable support is shifted rearwardly when said hitch means yields, as under overload conditions.

6. A plow adapted to be connected to a tractor having a power lift including a part movable by increments through a depth adjusting range of movement and through a further lifting range of movement, said plow comprising a plow beam having a furrow opener at its rear end, a member adapted to be connected with said power lift part to be actuated thereby in a generally fore and aft direction, a swingable support adapted to be connected at its upper end with the tractor and pivotally connected at its lower end with the front end of said plow beam, cushion hitch means operatively connected between the tractor and the front end of said plow beam, a swingable member pivoted at one end on said swingable support, link means connecting the other end of said swingable member with said first mentioned member, whereby said members are caused to move together by operation of said power lift part, an arm connected with said power lift part and movable thereby with said first mentioned member, a slack connection between the outer end of said arm and the rear portion of said plow beam, a second arm adapted to be pivotally mounted on the tractor and operatively connected to raise and lower the front end of said plow beam, and means operatively connecting said second arm with said swingable member, said means including link means movable into a substantially dead-center relationship when said first mentioned arm has been moved through an extent sufficient to take up the slack in the connection between said first mentioned arm and the rear portion of the plow beam.

7. A plow adapted to be connected to a tractor having a power lift including a part movable by increments through a depth adjusting range of movement and through a further lifting range of movement, said plow comprising a plow beam having a furrow opener at its rear end, a rear arm adapted to be connected to be moved by said power lift part and having a slack connection with the rear portion of said plow beam, the slack in said connection being taken up by movement of said power lift part and the corresponding movement of said rear arm by the movement of said power lift part through said depth adjusting range, a swingable member operatively connected to be moved simultaneously with said first mentioned arm, a forward arm connected with the front portion of the plow beam, and a toggle linkage connecting said swingable member with said forward arm, said toggle linkage moving into substantially dead-center relationship by the movement of said swingable member corresponding to movement of said power lift part through its depth adjusting range and into its lifting range, whereby movement of said power lift part to completion in its lifting range acts through said normally slack connection to raise the rear end of said plow beam while said toggle linkage, acting through said forward arm, serves to prevent any substantial amount of movement of the front end of said plow beam during movement of said power lift part through its lifting range.

8. The invention set forth in claim 7, further characterized by said toggle linkage moving past its dead-center position and acting through said forward arm for lowering the front end of the plow beam when the power lift part moves through the latter portion of its lifting range.

9. A plow adapted to be connected to a tractor having a power lift including a part movable by increments through a depth adjusting range of movement and through a further lifting range of movement, said plow comprising a plow beam having a furrow opener at its rear end, a fore and aft swingable support adapted to be connected at its upper end with the tractor, a draft member disposed generally in a horizontal position and pivotally connected intermediate its ends to the lower end of said swingable support, a yieldable hitch connection between the forward end of said draft member and the tractor, yielding of said connection, as under an overload, permitting said support to swing rearwardly, means pivotally connecting the rear end of said draft member with the forward portion of said plow beam, said draft member lying generally above a line extending through the front and rear ends of said draft member, whereby the draft force acts through said draft member to swing the rear portion of the latter and the front portion of said plow beam downwardly, depth adjusting mechanism connected with the front portion of said plow beam and said power lift part during movement of the latter through its depth adjusting range for limiting the downward movement of said plow beam under the influence of said draft force, and a lifting connection between said power lift part and the rear portion of said plow beam for raising the furrow opener into its transport position by movement of said power lift part through its lifting range of movement.

10. In a tractor mounted plow having a generally longitudinally extending beam and adapted to be mounted on a tractor having a power operated unit, a swingable support adapted to be connected at its upper end with the tractor, a draft member pivotally connected intermediate its ends to the lower portion of said swingable support, yieldable hitch means connected between the forward end of said draft member and the tractor, means pivotally connecting the rear end of said draft member with the forward portion of said plow beam, the point of pivotal connection of said draft member with the swingable support lying above the line of pull exerted through said hitch means to said draft member, and depth adjusting means connected with the front end of said plow beam and operated by said power operated unit for limiting the downward movement of the front end of said plow beam under the influence of draft force acting against the front end of the plow beam through said draft member.

11. In a tractor mounted plow having a generally longitudinally extending plow beam adapted to be mounted on a tractor having a power operated unit, and a furrow opener carried by the rear portion of said plow beam, the combination of a support adapted to be connected at its upper end with the tractor, a draft member pivotally connected intermediate its ends with the lower end of said support, a draft connection between the front end of said draft member and the tractor, said draft member and its point of pivotal connection with said support lying generally above the line of said draft connection, whereby the effect of draft force exerted along said line serves to swing the rear end of said draft member downwardly, means pivotally connecting the rear end of said draft member with the forward portion of said plow beam, and depth controlling means connected with the front end of said plow beam and adapted to act between the latter and the tractor for limiting the downward movement of the front end of said plow beam.

12. The invention set forth in claim 11, further characterized by said depth controlling means comprising an arm adapted to be pivotally mounted on the tractor, means connecting the swinging end of said arm with the front end of said plow beam, a swingable member pivotally mounted on said support, a link connecting said swingable member with said arm, and means connected with the outer end of said swingable member for swinging the latter and acting through said arm to raise and lower the front end of said plow beam.

13. The invention set forth in claim 12, further characterized by said support being swingable in a generally fore and aft direction and said hitch means being yieldable as under an overload.

14. In a tractor mounted plow having a generally longitudinally extending beam with a furrow opener connected to the rear portion thereof, said beam being adapted to be mounted on a tractor having a power operated unit, the combination of a support adapted to be connected at its upper end with the tractor, a draft member pivotally connected intermediate its ends with the lower end of said support, a hitch connected to the lower end of said support and with the forward end of said draft member and adapted to be connected at its forward end with the tractor, means pivotally connecting the rear end of said draft member with the forward portion of said plow beam, a swingable member pivotally mounted on said support, a generally vertically swingable arm adapted to be pivotally mounted on the tractor and connected at its outer end with the front portion of said plow beam, whereby up-and-down movements of said arm serve to raise and lower said plow beam at its forward end, a link pivotally connected at one end with said arm and at the other end with said swingable member, a part connected at its forward portion with the outer end of said swingable member and adapted to be connected at its rear portion with said power operated unit to be operated thereby for shifting said swingable member and acting through said link to raise and lower said arm, said link and swingable member moving into substantially a straight-line relation by operation of said power operated unit through a portion of its extent of movement, whereby movement of said power operated part beyond said portion effects substantially no movement of said arm and the forward end of said plow beam, and lifting means connected at its lower end with the rear portion of said plow beam and adapted to be connected at its upper end with said power actuated unit, said connection being of such length that only movement of said power actuated unit beyond said above mentioned extent of movement acts to raise the rear portion of said plow beam.

15. The invention set forth in claim 14, further characterized by movement of said swingable member beyond said straight-line position acting through said arm to lower the front end of said plow beam a slight amount when the rear portion of said plow beam is raised by movement of said power actuated unit beyond said extent of movement thereof.

References Cited in the file of this patent

UNITED STATES PATENTS

| Number | Name | Date |
|---|---|---|
| 941,299 | Bennett | Nov. 23, 1909 |
| 1,378,842 | Dittbrenner | May 24, 1921 |
| 2,358,281 | Ray | Sept. 12, 1944 |
| 2,436,155 | Silver | Feb. 17, 1948 |
| 2,485,651 | Oerman | Oct. 25, 1949 |